June 11, 1929.   R. D. PIKE ET AL   1,716,663
PROCESS FOR PRODUCTION OF POTASSIUM CARBONATE
Filed March 6, 1928
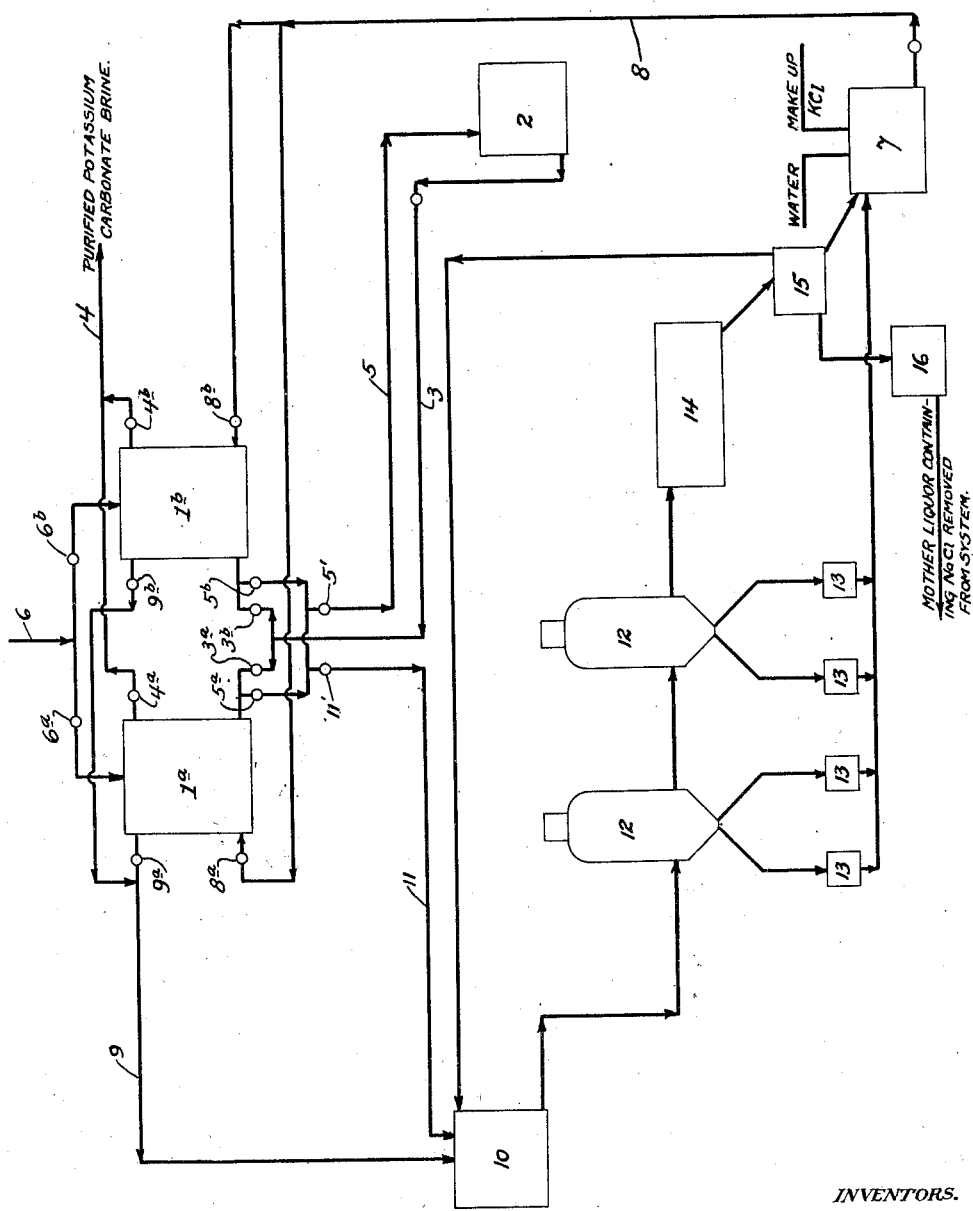
INVENTORS.
Robert D. Pike,
Leo V. Steck,
Ross Cummings,
BY Townsend, Loftus & Hett
ATTORNEYS.

Patented June 11, 1929.

1,716,663

UNITED STATES PATENT OFFICE.

ROBERT D. PIKE, OF PIEDMONT, LEO V. STECK, OF OAKLAND, AND ROSS CUMMINGS, OF BERKELEY, CALIFORNIA; SAID STECK AND SAID CUMMINGS ASSIGNORS TO SAID PIKE.

PROCESS FOR PRODUCTION OF POTASSIUM CARBONATE.

Application filed March 6, 1928. Serial No. 259,423.

Our present invention relates to a method for producing commercially pure potassium carbonate from brine carrying the carbonates of sodium and potassium and more particularly to such a method for treatment of the crude potassium carbonate brine which is the principal product of a process covered by a copending application filed concurrently herewith by us and identified as case "Q".

The above crude potassium carbonate has a mol ratio $K_2O/Na_2O$ of 3.26 and by our present invention this same mol ratio may be increased to 12/1, or higher, to the end that commercially pure potassium carbonate in solid form may be produced directly from the purified brine.

In general our invention is based upon the use of base exchange zeolites of the water softening type for effecting separation of sodium from potassium in the crude brine. In our process the crude brine is run over a potash zeolite for removal of sodium from the brine and its replacement with potassium, and after the potash zeolite has become "exhausted" regenerating it by passing over it a solution of substantially pure muriate of potash.

A preferred method of carrying out our process is shown in the accompanying drawing.

The zeolite is stored in suitable tanks $1^a$ and $1^b$ which are used alternately for run and regeneration, and is supported therein upon a porous false bottom. We will assume that the tank $1^b$ is ready for the run, which means that the zeolite which it contains is potash zeolite, and that the regenerating solution has been drained off, and that the potash zeolite has been washed free from chloride. The crude potassium carbonate brine containing 5% to 10% total solids is stored in a tank 2 and is pumped through a pipe line 3. During this operation the valve $3^b$ is open and valve $3^a$ is shut. The brine is then pumped up through the zeolite in tank $1^b$ at a very rapid rate corresponding to about ten gallons per square foot of horizontal area per minute. As soon as the flow becomes visible at the top of the tank $1^b$, the rate is cut down to one-half gallon per minute per square foot. The purpose of the high initial rate of flow is to displace air from the interstices between the zeolite particles, but this rate of flow is too high for efficient base exchange. The brine issues from the top of the tank as a purified brine of potassium carbonate and flows out through a pipe 4. The valve $4^b$ is open and the valve $4^a$ is shut during this operation. At first the brine is a practically pure solution of potassium carbonate, but as the flow proceeds the sodium carbonate increases and the time of flow is regulated by the requirements for purity in the total flow of the purified brine.

In a typical case, starting with a crude brine containing 5% total solids, the reaction time is fifty-two minutes to give an effluent whose solid content contains on the average 96.2% by weight $K_2CO_3$. At the end of the run the valves $3^b$ and $4^b$ are closed and valves $5^b$ and $5'$ are opened to allow the liquid contents of tank $1^b$ to drain back into tank 2. Valve $6^b$ is now opened and the zeolite in $1^b$ is washed to remove carbonates and the washings also drain into tank 2. Tank $1^b$ is now ready for regeneration. To effect this, the valve $8^b$ is opened and a strong solution containing 10% to 15% KCl is pumped up through the zeolite from a tank 7. The rates of pumping are the same as those observed with the crude potassium carbonate brine. The potassium in the KCl brine replaces the sodium in the zeolite very rapidly; the latter passes into solution, and in about ten to fifteen minutes the zeolite is restored to the potash rich condition and is ready for another run. The effluent during regeneration passes through a valve $9^b$ and via pipe 9 into a tank 10. After regeneration, valve $6^b$ is again open and the chlorides washed out of the zeolites, the washings of this operation draining through valves $5^b$ and $11'$ into the tank 10. After washing and draining, these valves are reset as at the beginning of the above described cycle and the tank $1^b$ is ready for another run. The cycle of tank $1^a$ is the same as $1^b$, and for continuous operation they are used alternately.

In practice more than two tanks can be used if desired so as to insure a substantially uniform flow. The tank 10 contains a solution of potassium chloride, with some sodium chloride. It is therefore necessary to separate the former from the latter in order that the potassium chloride may be used again for regeneration. It is also necessary to add KCl to make up for that actually converted to NaCl in the process of regeneration. The solution from tank 10 is therefore run through multiple effect evaporators 12 in which KCl is salted out and is removed by salt catchers 13 of any suitable design. The mother liquor and wash water from these crystals is returned into the evaporator circuit. Evaporation is continued until the solution is nearly saturated with NaCl. The strong liquor goes to crystallizer 14 where KCl is crystallized out by cooling and is removed in centrifuge 15; the mother liquor from these crystals contains much NaCl and some KCl and is preferably removed from the process to a tank 16 for treatment elsewhere. The water used for washing the crystals in the centrifuge 15 goes back to the evaporator circuit via the tank 10. The KCl crystals go to tank 7 where they are dissolved in water preparatory to being again employed for regenerating the zeolite. The make up KCl is added to tank 7.

In effect, substantially all of the sodium in the crude carbonate brine is replaced by its equivalent potassium, the latter being brought in as potassium chloride and the chlorine associated with the latter is rejected from the system as sodium chloride in association with the sodium of the crude carbonate brine. It is thus seen that no reagents are actually used up, and the principal cost of the process is for fuel for evaporating.

We have found that zeolites which are commercially available as water softeners are suitable for our process, and it is necessary to keep in the tanks from three to five tons of zeolite for each ton of $K_2O$ produced daily as the carbonate.

While we have described a preferred method of carrying out our invention, it is to be understood that various changes may be made between the limits herein set forth and in the sequence of operations without departing from the spirit of the invention as defined in the appended claims.

Having thus described our invention, what we claim and desire to secure by Letters Patent is—

1. The process for separating the potassium and sodium contents of carbonate brine which consists in passing the brine over a potash zeolite thus replacing sodium in the brine with potassium from the zeolite, and regenerating the zeolite with a solution of a potassium salt.

2. The process for separating the potassium and sodium contents of carbonate brine which consists in passing the brine over a potash zeolite, thus replacing sodium in the brine with potassium from the zeolite, then regenerating the zeolite with a solution of potassium chloride.

3. The process for separating the potassium and sodium contents of carbonate brine which consists in passing the brine over a potash zeolite, thus replacing sodium in the brine with potassium from the zeolite, then regenerating the zeolite with a solution of potassium chloride, and treating the spent regenerating solution by evaporation and crystallization for removal of sodium chloride and recovery of potassium chloride.

4. The process of removing sodium from a mixed brine of potassium and sodium carbonate which consists in passing the brine over a potash zeolite which will give up potassium to and remove sodium from the brine.

ROBERT D. PIKE.
LEO V. STECK.
ROSS CUMMINGS.